United States Patent
Makkonen

(10) Patent No.: US 8,897,816 B2
(45) Date of Patent: Nov. 25, 2014

(54) METHOD AND APPARATUS FOR LOCATING INFORMATION FROM SURROUNDINGS

(75) Inventor: Perttu Makkonen, Tampere (FI)

(73) Assignee: Nokia Corporation, Espoo (FI)

( * ) Notice: Subject to any disclaimer, the term of this patent is extended or adjusted under 35 U.S.C. 154(b) by 355 days.

(21) Appl. No.: 12/817,748

(22) Filed: Jun. 17, 2010

(65) Prior Publication Data

US 2011/0312309 A1 Dec. 22, 2011

(51) Int. Cl.
*H04W 24/00* (2009.01)
*G06Q 30/02* (2012.01)
*H04L 29/08* (2006.01)
*G06Q 30/06* (2012.01)

(52) U.S. Cl.
CPC ............ *H04L 67/18* (2013.01); *G09G 2380/04* (2013.01); *G06Q 30/02* (2013.01); *G06Q 30/06* (2013.01)
USPC ..................... 455/457; 455/456.1; 455/414.1; 382/165; 382/170; 382/181

(58) Field of Classification Search
CPC .. H04L 67/18; H04L 12/40117; G06Q 30/02; G06Q 30/06; G09G 2380/04; H04N 1/00326; H04N 1/00336; H04N 1/00381; H04N 5/23219; G06K 9/00; G06K 9/00221; G06K 9/00496; G06K 9/00624
USPC ............... 455/404.2, 414.1–414.4, 418–420, 455/456.1–457, 550.1–90.3; 379/913, 379/15.05; 382/159–161, 165, 170, 382/181–231; 340/539.13, 988–996; 707/705–782, E17.001, 707/E17.004–E17.006, E17.014–E17.017, 707/E17.019–E17.031; D10/104.2
See application file for complete search history.

(56) References Cited

U.S. PATENT DOCUMENTS

| | | | |
|---|---|---|---|
| 2003/0144843 A1* | 7/2003 | Belrose ..................... | 704/270.1 |
| 2008/0062262 A1* | 3/2008 | Perron et al. ................... | 348/82 |
| 2008/0279425 A1* | 11/2008 | Tang .............................. | 382/118 |
| 2009/0102858 A1* | 4/2009 | Eggers et al. ................. | 345/617 |
| 2010/0250136 A1* | 9/2010 | Chen ............................ | 701/300 |
| 2010/0260426 A1* | 10/2010 | Huang et al. .................. | 382/218 |
| 2010/0272350 A1* | 10/2010 | Lee ................................ | 382/159 |
| 2010/0290699 A1* | 11/2010 | Adam et al. ................... | 382/155 |
| 2011/0170787 A1* | 7/2011 | Gum ............................. | 382/209 |

* cited by examiner

*Primary Examiner* — Ronald Eisner
(74) *Attorney, Agent, or Firm* — Alston & Bird LLP

(57) ABSTRACT

An apparatus includes at least one a processor, and at least one memory including computer program code, the at least one memory and the computer program code configured to, with the at least one processor, cause the apparatus at least to determine that an input defining a piece of information to be located has been received, determine the location of the information in an environment of the apparatus, and report the location.

19 Claims, 17 Drawing Sheets

METHOD AND APPARATUS FOR LOCATING INFORMATION FROM SURROUNDINGS

BACKGROUND

Locating an item in the surrounding physical environment may be difficult, especially in a crowded situation. For example, it may be difficult to locate a particular magazine in a rack with hundreds of different publications. It may also be challenging to locate a book positioned on a large shelf with many other titles in a library or bookstore. In a crowded city, it may be difficult for a foreigner to locate text in an unfamiliar language that may be displayed on buildings and street signs.

It would be advantageous to provide a facility for identifying desired information within an environment where the information is not readily discernable, such as in a crowded setting.

SUMMARY

An apparatus is disclosed including at least one processor and at least one memory including computer program code, the at least one memory and the computer program code configured to, with the at least one processor, cause the apparatus at least to determine that an input defining a piece of information to be located has been received, determine the location of the information in an environment of the apparatus, and report the location.

A method is disclosed including determining that an input defining a piece of information to be located has been received by an apparatus, determining the location of the information in a surrounding environment of the apparatus, and reporting the location.

BRIEF DESCRIPTION OF THE DRAWINGS

The foregoing aspects and other features of the presently disclosed embodiments are explained in the following description, taken in connection with the accompanying drawings, wherein.

DETAILED DESCRIPTION

Figure 1:
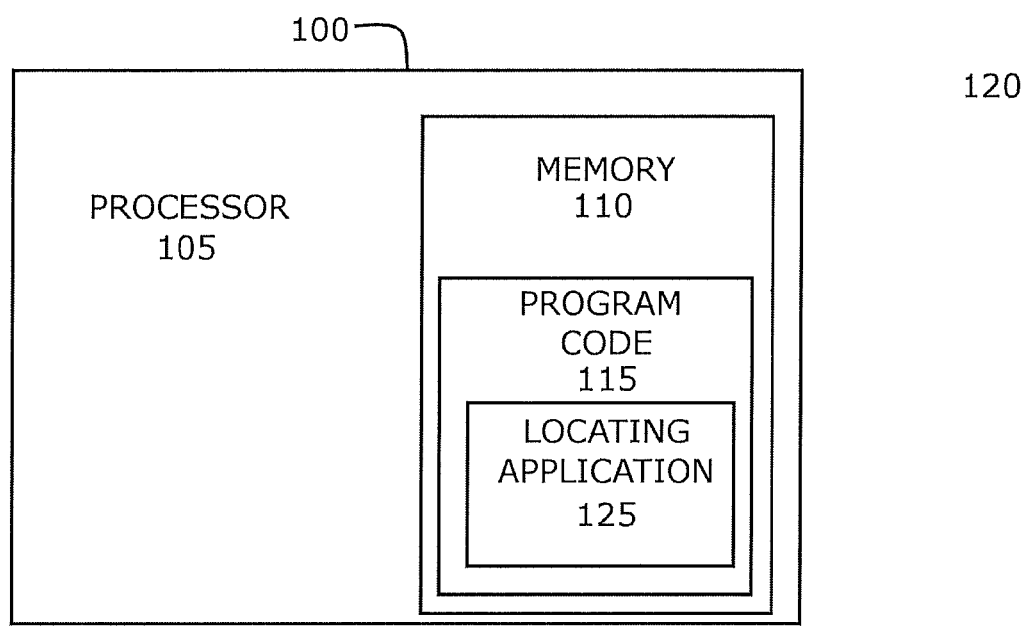
FIG. 1 illustrates a block diagram of an exemplary embodiment in the form of an apparatus.

FIG. 1 illustrates a block diagram of an exemplary embodiment in the form of an apparatus 100. As a non-limiting example, the apparatus 100 may be an integrated circuit. Apparatus 100 includes a processor 105 and a memory 110 including computer program code 115. The memory 110 and the program code 115 are configured to, with the processor 105, cause the apparatus 100 at least to determine a location of predefined information in an environment 120 of the apparatus. The processor 105, and the other processors disclosed in this application, may include one or more of a microprocessor, a digital signal processor, a special purpose computer chip, a field programmable gate array, a controller an application specific integrated circuit a computer or any suitable processor. The memory 110, and the other memories disclosed in this application, may include any non-transitory computer readable medium, for example, one or more of a magnetic media, diskette, disk, computer hard drive, optical media, compact disk, digital versatile disk, semiconductor, read-only memory, random access memory, or any suitable program code storage medium. The memory 110 and the program code 115 may also be configured to, with the processor 105, cause the apparatus 100 at least to determine that an input defining a piece of information to be located has been received, determine the location of the information in the environment 120 of the apparatus, and report the location. The program code 115 may include an application 125 configured to, with the processor 105, cause the apparatus 100 to search for the information in the environment 120, and upon locating the information, report the location for further use.

Figure 2:
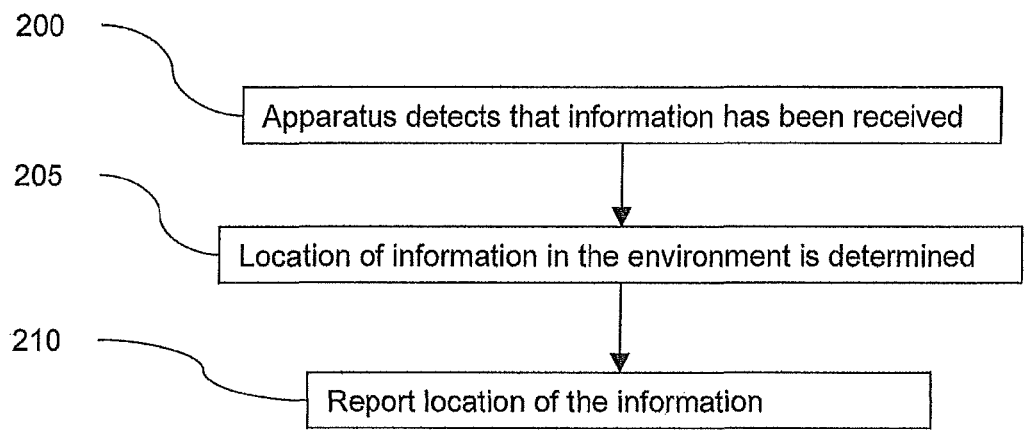
FIG. 2 shows a flow diagram illustrating the operations of the apparatus.

FIG. 2 shows a flow diagram illustrating this process. In block 200, the apparatus detects that a piece of information to be located has been received. In block 205 the location of the information in the environment of the apparatus is determined, and in block 210, the location of the information is reported.

Figure 3:
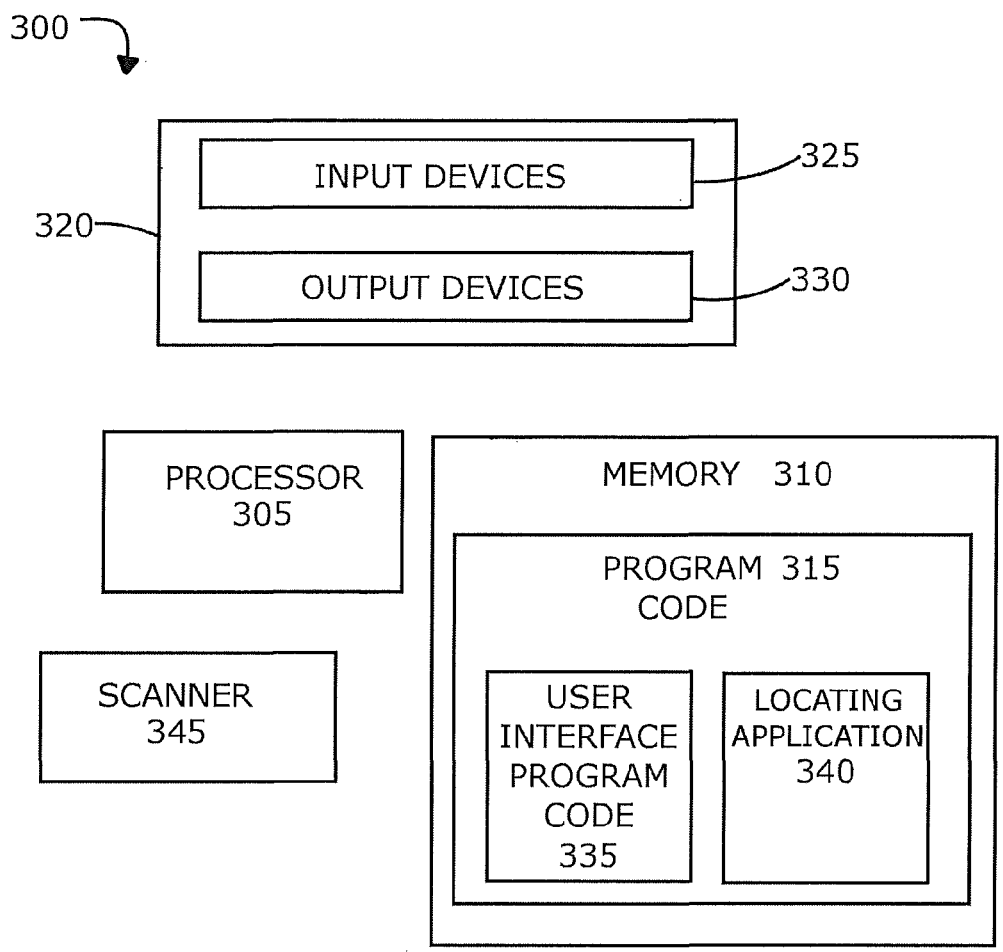
FIG. 3 illustrates another exemplary embodiment in the form of a computing device.

FIG. 3 illustrates another exemplary embodiment in the form of a computing device 300. Apparatus 100 may be included as part of this embodiment. Computing device 300 may be a personal computer, a tablet computer, touch pad device, Internet tablet, a laptop, desktop computer or any suitable computing device. Computing device 300 may be fixed or portable and typically includes a processor 305, a memory 310 with computer program code 315, and a user interface 320. The user interface 320 may generally include user interface circuitry and the program code 315 may include user interface program code 335 for controlling the user interface 320. The user interface generally includes one or more input devices 325 and one or more output devices 330. The input and output devices may include one or more of a keyboard, a number of hard or soft keys, a display, a touch screen, or any other devices suitable for receiving input and for providing output. The computing device 300 may also include a scanner 345 for surveying the environment in which the computing device is located. The scanner 345 may be included as part of the input devices 325 or output devices 330 and may comprise a camera or any other circuitry configured to collect information or characteristics from the environment surrounding the computing device 300. The program code 315 includes a locating application 340 for analyzing the information collected by the scanner 345 and recognizing predetermined information or a specific pattern within the collected information.

Figure 4:
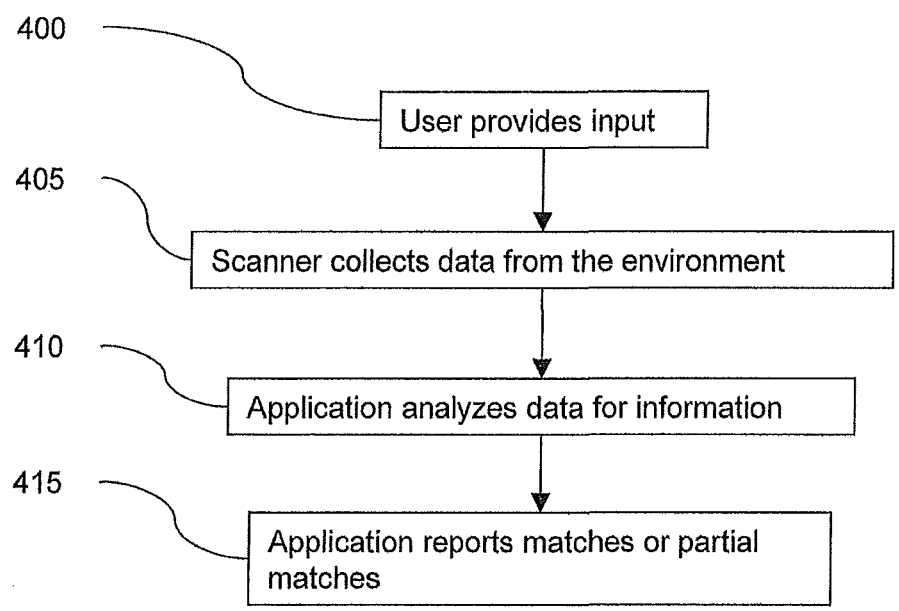
FIG. 4 shows a flow diagram illustrating exemplary operations of the computing device.

FIG. 4 shows a flow diagram illustrating exemplary operations of the computing device 300. In block 400, a user provides input to the computing device 300 in the form of information to be located within the physical surroundings. As a non-limiting example, if the information to be located is a text string, the user may type the text using the keyboard, touch screen, hard keys or other appropriate part of the input devices 325. If the information is graphical, for example, a logo, the user may use the scanner to take a picture of an example of the logo. Alternately, the user may draw a depiction of the text, logo, or other information on the touch screen if the computing device 300 is so equipped. In block 405, the locating application 340 enables the scanner 345 and captures data from the environment. The scanner 345 may be pointed in a particular direction or toward an object to be surveyed. The locating application may also provide interactive directions to the user with respect to pointing the scanner 345. In block 410, the application analyses the captured data for patterns that match or partially match the input. In block 415, the matching or partially matching patterns are reported. For example, as the scanner 345 is pointed in a particular direction, the data collected by the scanner is provided on a display. Matches or partial matches may be reported by highlighting them on the display with different colors, outlines, or other distinguishing characteristics.

Figure 5A:
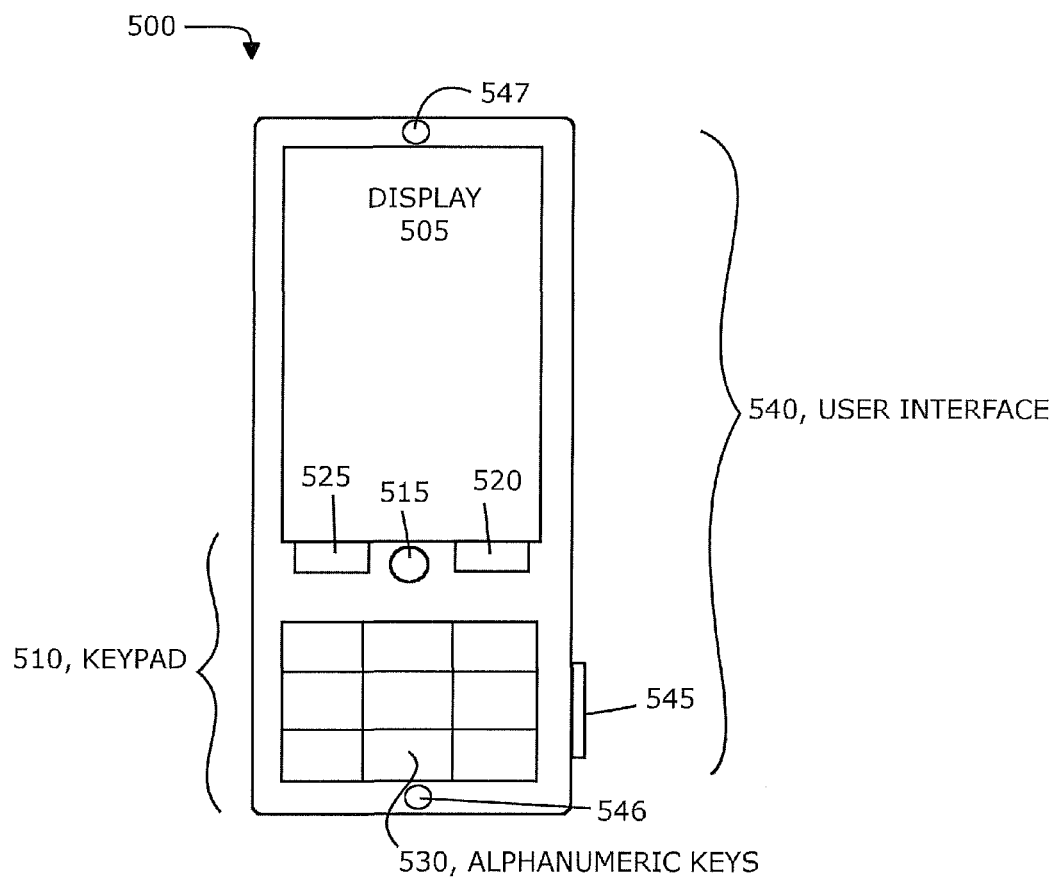
FIGS. 5A and 5B illustrate another exemplary embodiment in the form of a mobile communications device.
Figure 5B:
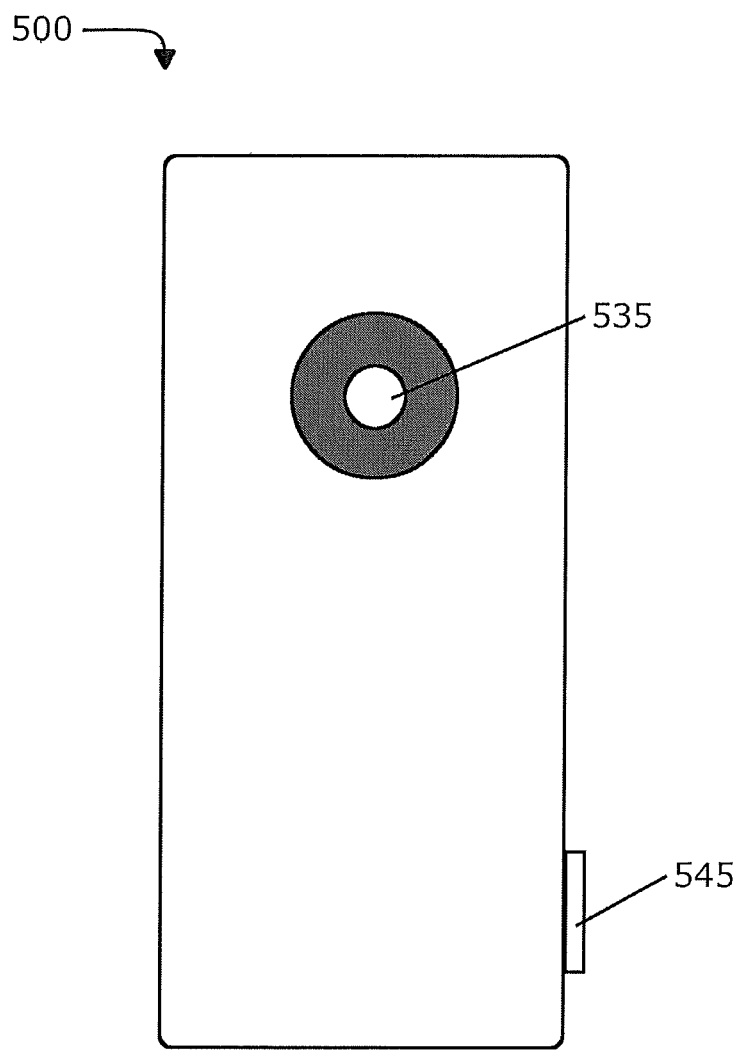

FIGS. 5A and 5B illustrate another exemplary embodiment in the form of a mobile communications device 500. The computing device 300 may be included as a part of the mobile communication device 500. The mobile communications device 500 may be a mobile terminal, a cellular/mobile phone, a multimedia device, a personal communicator, a personal digital assistant, or any other suitable device. Mobile communications device 500 includes a user interface 540 with a display 505 and a keypad 510. The keypad 510 may include any suitable input devices such as, for example, a multi-function/scroll key 515, soft keys 520, 525, and alphanumeric keys 530. Mobile communications device 500 also includes an image capture device 535 such as a camera as a further input device. The display 505 may include a touch screen and a graphical user interface. The mobile communications device 500 may also include a key 545 for enabling the image capture device 535. The user interface may also include a microphone 546 and a speaker 547 for inputting and outputting speech and oral commands.

Figure 5C:
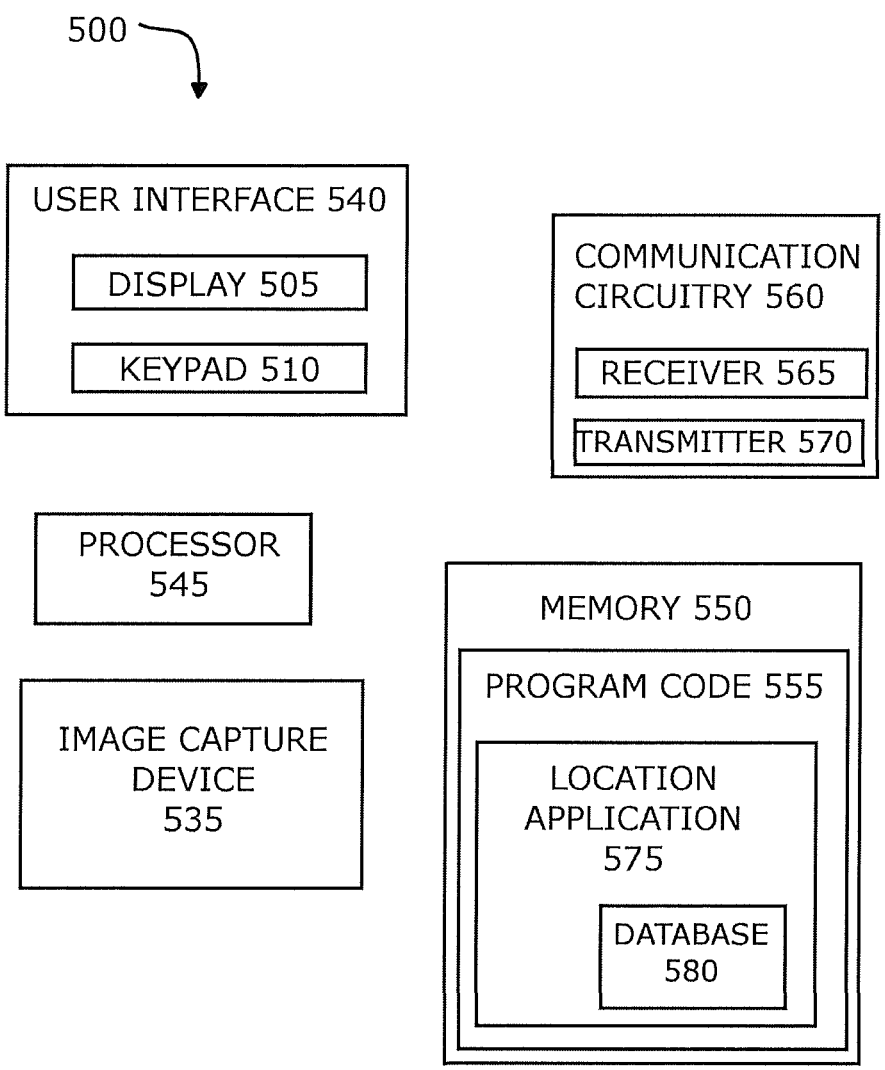
FIG. 5C illustrates a block diagram of the mobile communications device.

FIG. 5C illustrates a block diagram of the mobile communications device 500. As mentioned above, the device 500 includes a user interface 540 with a display 505 and a keypad 510. The mobile communications device 500 also includes one or more processors 548 and memories 550 including computer program code 555 that further includes a locating application 575, similar to locating application 340, for detecting a user input defining information to be located within the environment surrounding the mobile communications device 500, scanning the environment and determining the location of the information, and providing the location to the user. The mobile communications device 500 may also include communication circuitry 560 for exchanging information with other devices. The communication circuitry 560 generally includes a receiver 565 and a transmitter 570 for network communication. The communication circuitry 560 is generally configured to allow the mobile communications device 500 to receive and send communications and messages, such as voice transmissions, text messages, chat messages, multimedia messages, still images, video and email, over a network, such as a wired or wireless network.

Figure 6:
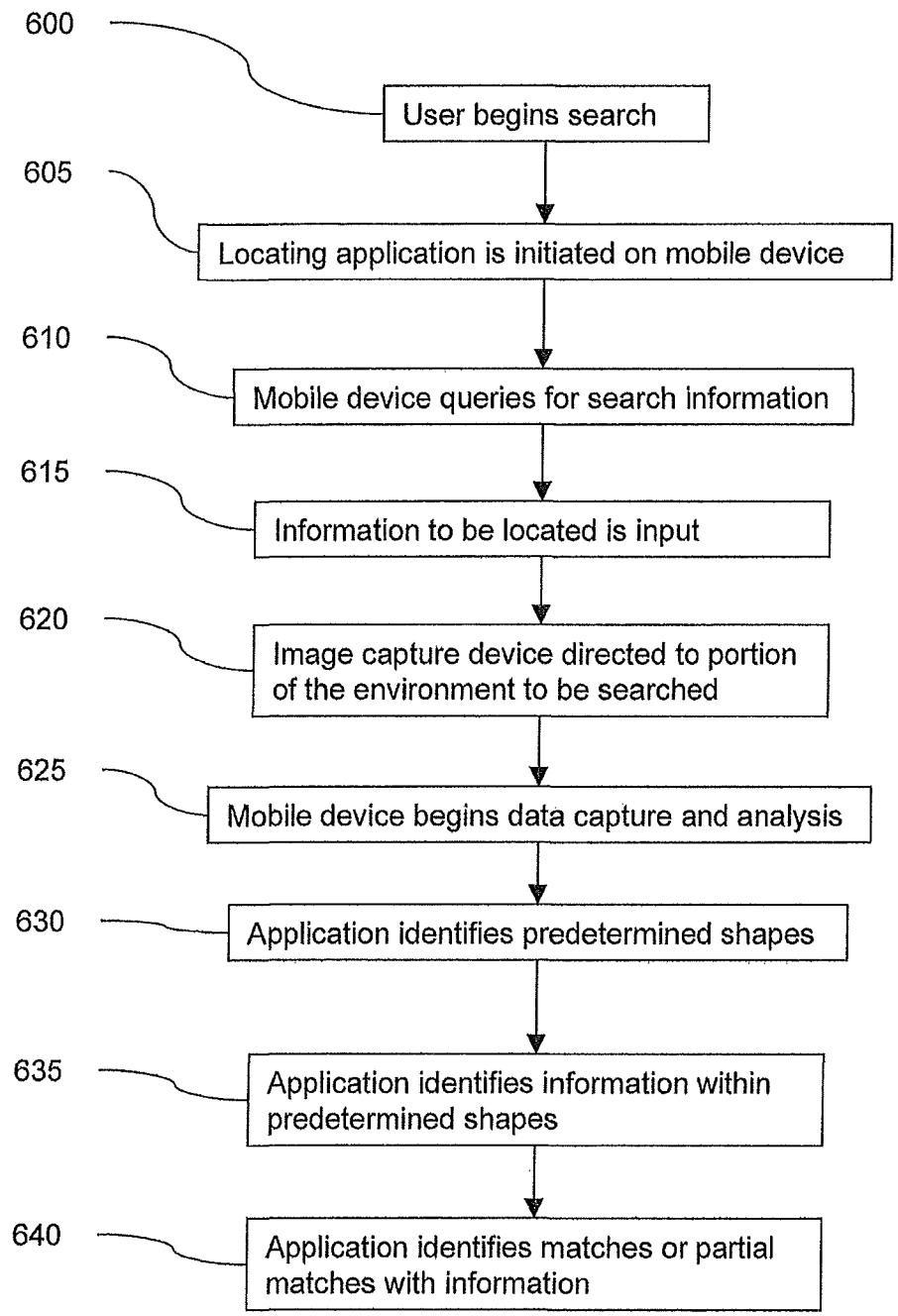
FIG. 6 in combination with FIGS. 7A-7H illustrate exemplary operations of the mobile communications device.
Figure 7A:
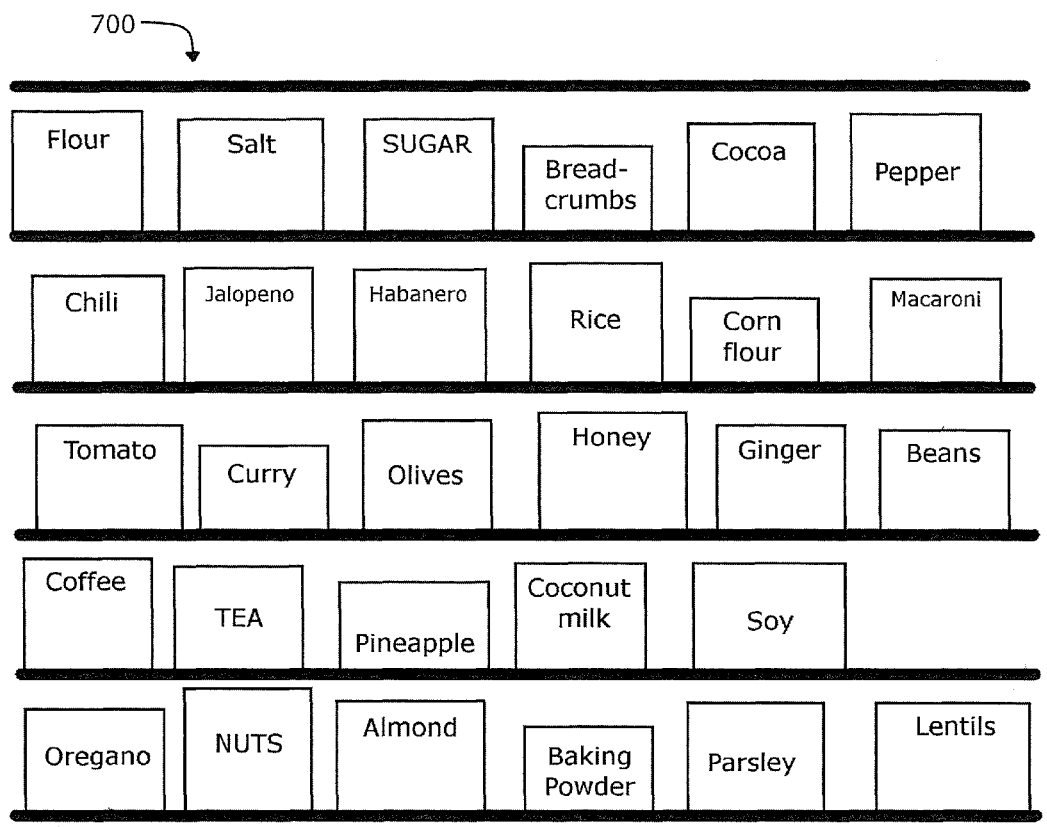
Figures 7B, 7C:
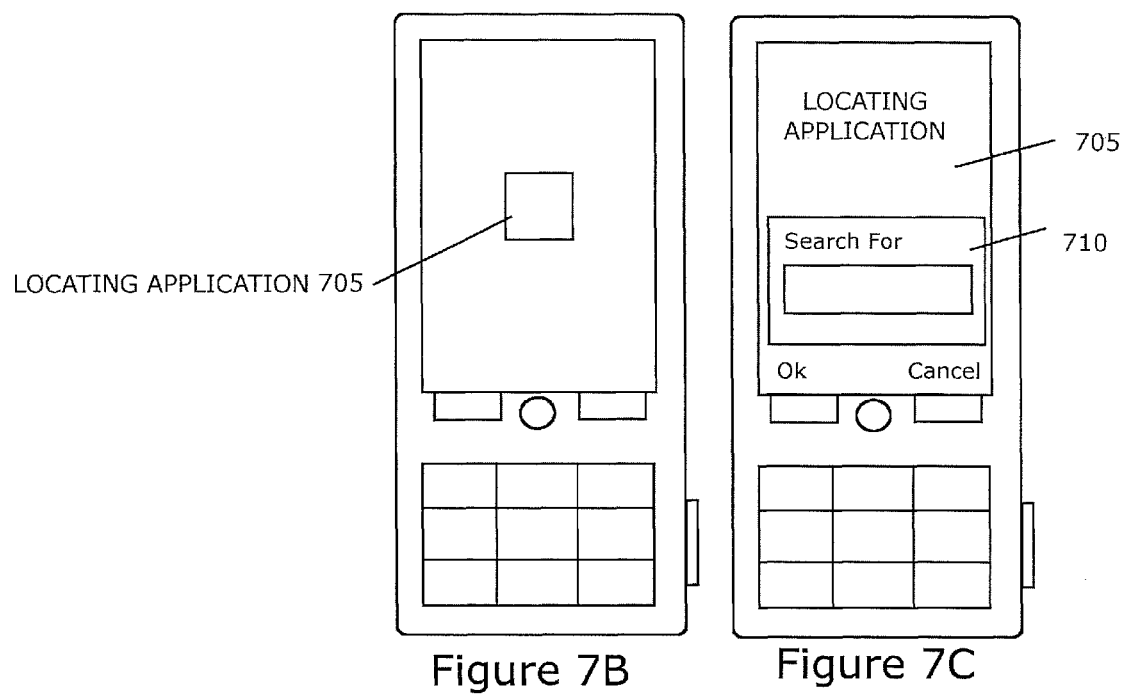
Figure 7D:
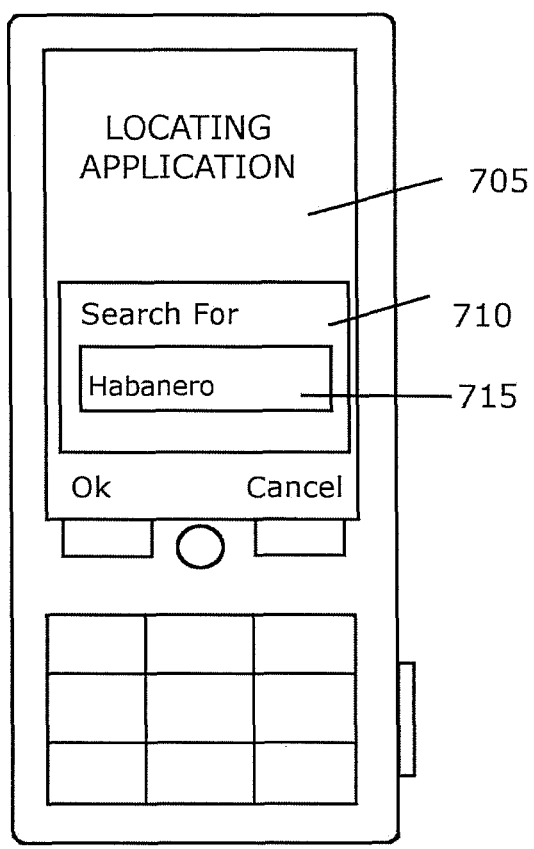

FIG. 6 in combination with FIGS. 7A-7H illustrate exemplary operations of this embodiment. In block 600, a user begins a search for an item among a large number of items 700 on the shelves of a grocery store or supermarket, as shown in FIG. 7A. In block 605, the locating application is launched, by way of a key press or other operation. The mobile communications device 500 may provide an indication 705 that the location application 575 has been launched as shown in FIG. 7B. After launching, the mobile communication device 500 may also provide directions or guidance for further operations, by text, voice commands, or other indicators. In block 610, the mobile communication device presents a query for the search information, shown as item 710 in FIG. 7C. In block 615, a user may respond to the query by providing an input that defines a piece of information to be located. As mentioned above, the information may include text, a picture from the scanner, a drawn depiction of the information, or any form of information that the mobile communication device 500 is capable of recognizing. In the example shown in FIG. 7D, a text input 715 is provided.

Figure 7E:
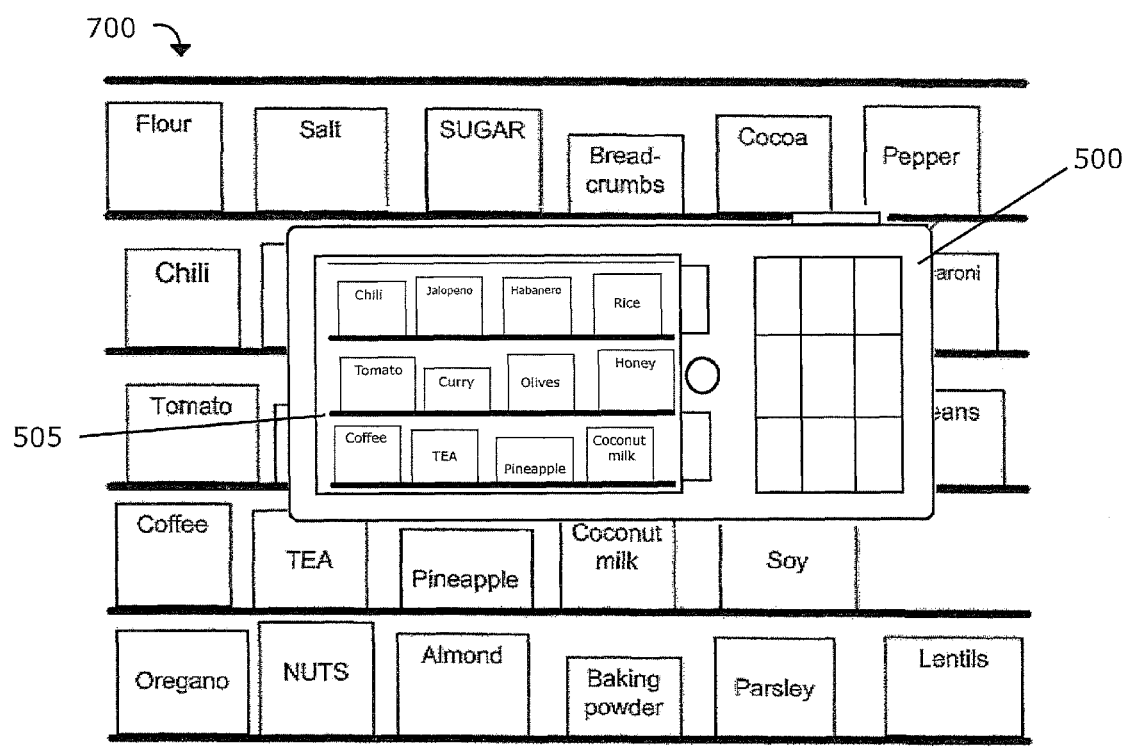

In block 620, the image capture device is aimed at a part of the physical environment to be searched, in this example, the items 700 on the shelves of the grocery store as shown in FIG. 7E. The portion of the environment may be provided on the display 505 to ensure that the proper area is being searched. In bock 625, the locating application may begin capturing and analyzing the displayed data automatically, or may begin the capture and analysis in response to an input, for example, a key press. As part of the analysis, the locating application 575 may use a statistical, syntactic, or other pattern recognition technique, as appropriate. The locating application 575 may include or have access to a database 580 of models to be used for comparison with the collected data to identify the matches with the search information. The models could include letters of selected alphabets in different typefaces for identifying text. The models could also include known street names, commercial business names and logos, publication titles, book titles, names of different food and drink items and producers, and any other models that may be applicable. In the event that a picture or a drawn depiction is submitted as an input, the locating application can generate an additional model based on the submitted information.

Figure 7F:
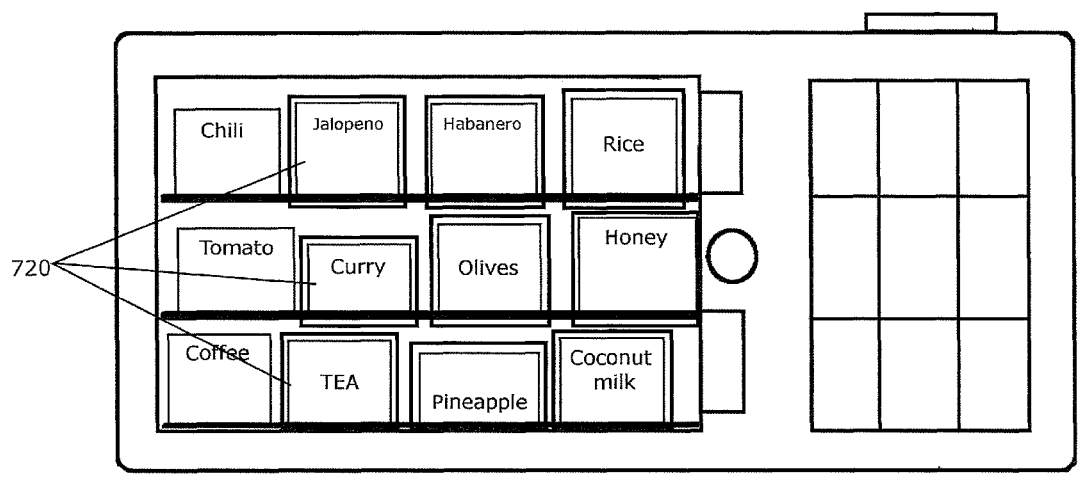

In block 630, as an optional operation for efficiency, the locating application may initially attempt to recognize certain predefined shapes within the collected data related to the information to be located. For example, if a logo is provided as the input, the locating application may categorize the input as a combination of known geometrical shapes and then search for the combination. As another example, if text is provided, the locating application may initially search for, identify, and highlight, shapes 720 that generally enclose text, for example, rectangles and squares as shown in FIG. 7F.

Figure 7G:
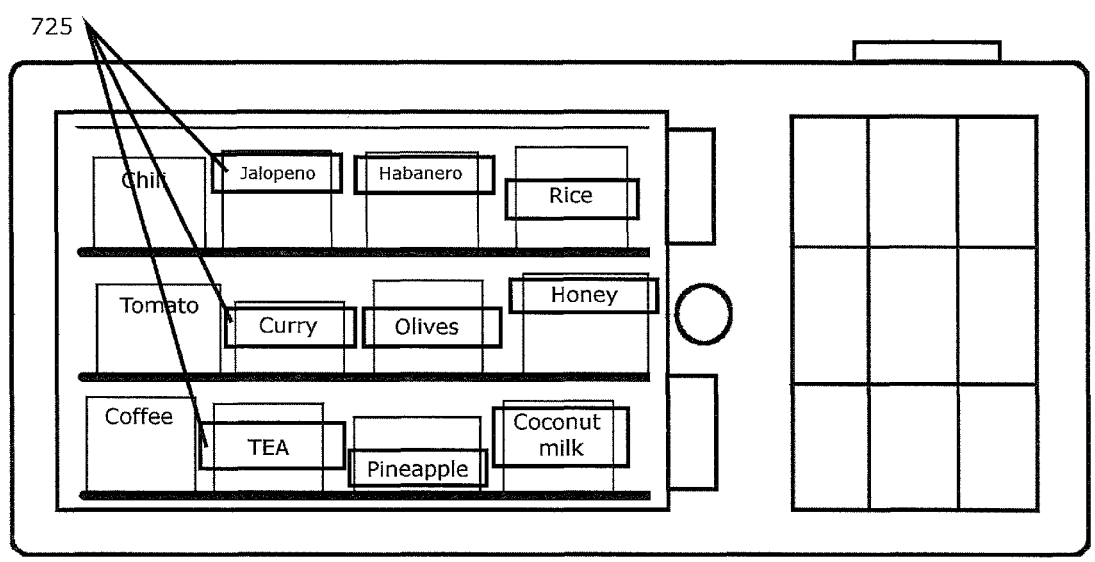
Figure 7H:
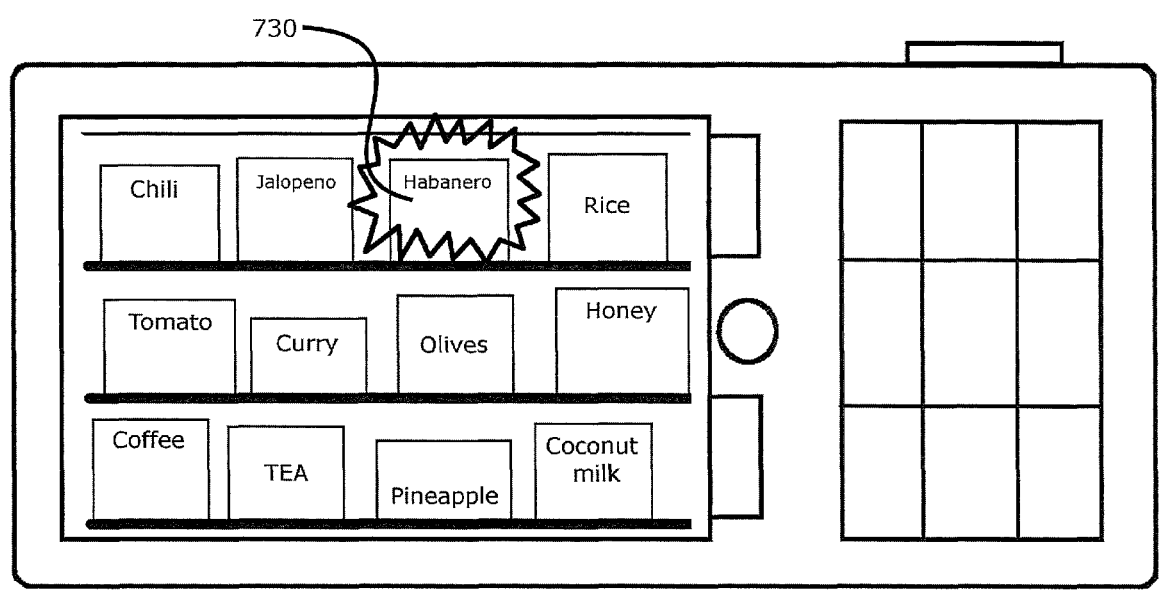

In block 635, in the example where the certain predefined shapes within the collected data are recognized, the location application 575 may proceed to identify text 725 within the recognized predefined shapes, as shown in FIG. 7G. Otherwise, in block 640, the location application 575 proceeds to identify items in the collected data that match or at least partially match the search information. In block 640, the matching data 730 (and partial matches if applicable) may be displayed, as shown in FIG. 7H and the mobile communication device 500 may provide a visual or audible alert. Once displayed, the user may now locate the item in the physical environment 700.

Figure 8:
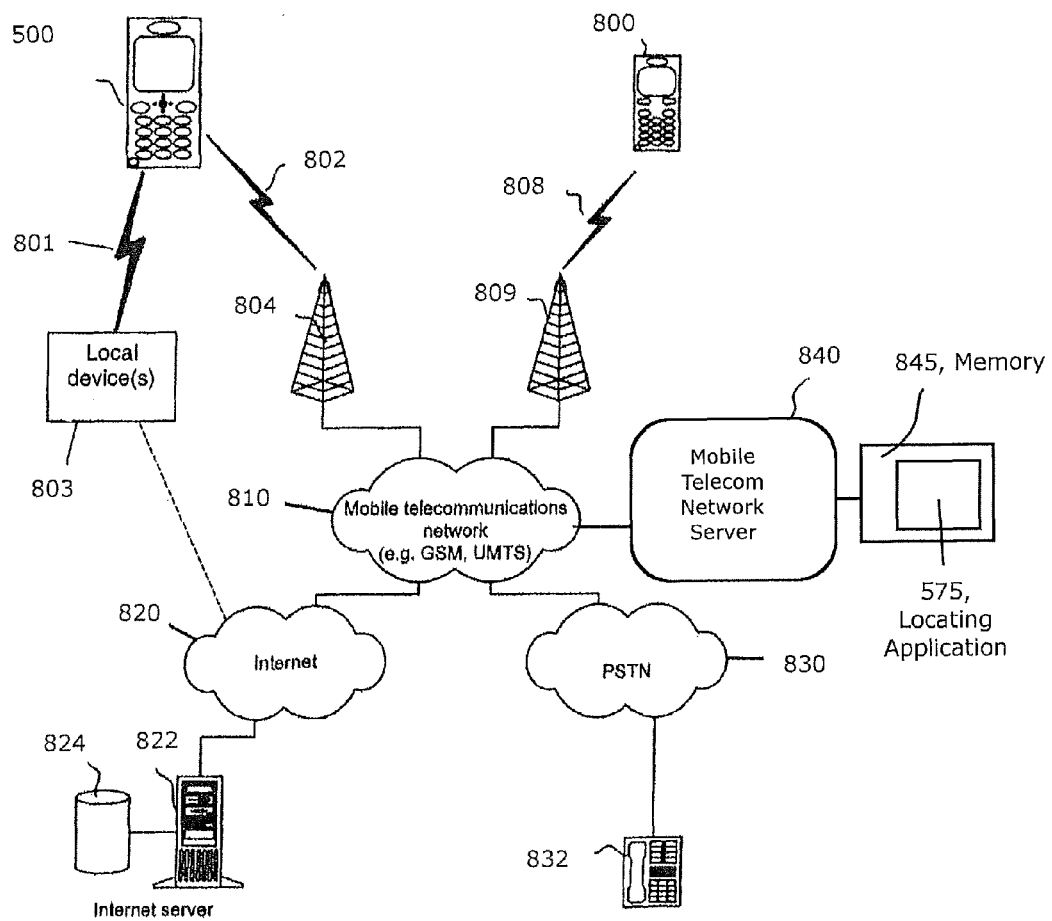
FIG. 8 shows an exemplary embodiment where the mobile communications device 500 is configured to communicate with a mobile telecommunications network.

FIG. 8 shows an exemplary embodiment where the mobile communications device 500 is configured to communicate with a mobile telecommunications network 810 and the locating application 575 is provided as a service by the mobile telecommunications network 810. In addition to the mobile communication device 500, other mobile terminals 800 may be connected to the mobile telecommunications network 810 through radio frequency (RF) links 802, 808 via base stations 804, 809. The mobile telecommunications network 810 may be in compliance with any commercially available mobile telecommunications standard such as for example the global system for mobile communications (GSM), universal mobile telecommunication system (UMTS), digital advanced mobile phone service (D-AMPS), code division multiple access 2000 (CDMA2000), wideband code division multiple access (WCDMA), wireless local area network (WLAN), freedom of mobile multimedia access (FOMA) and time division-synchronous code division multiple access (TD-SCDMA).

The mobile telecommunications network 810 may be operatively connected to a wide-area network 820, which may be the Internet or a part thereof. An Internet server 822 has data storage 824 and is connected to the wide area network 820. The server 822 may host a worldwide web/wireless application protocol server capable of serving worldwide web/wireless application protocol content to the mobile terminal 500. The mobile telecommunications network 810 may include one or more mobile telecommunications network servers 840. At least one of the mobile telecommunications network servers 840 has a memory 845 and is also connected to the mobile telecommunications network 810. A public switched telephone network (PSTN) 830 may be connected to the mobile telecommunications network 810, and one or more telephone terminals 832 may also be connected to the public switched telephone network 830. The mobile terminal 500 may also be configured for communicating to a device 803 via a link 801, including, for example, one or more of a piconet, Bluetooth™, USB, IEEE 802.11, RS-232, or any other suitable link. In this embodiment, the locating application 575 may be located as computer program code in a non-transitory computer readable medium in the memory 845.

Figure 9:
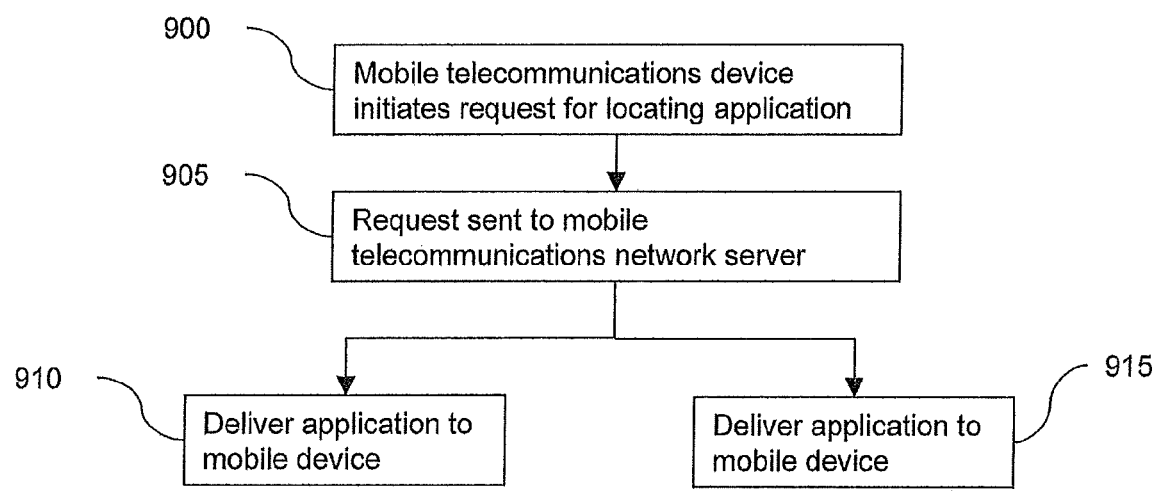
FIG. 9 shows the operations of the mobile communications network in providing the locating application as a service.

FIG. 9 shows the operations of mobile communications network 810 in providing the locating application 545 as a service. In block 900, a request for initiation of the location application is generated at the mobile telecommunications device 500. In block 905, the request is communicated to the mobile telecommunications network server 840 though the mobile telecommunications network 810. In block 910, the application may optionally be delivered or downloaded to the mobile device 500 and may operate as described above with respect to the mobile communication device embodiment. There may be a charge or fee for delivering the application. Alternately, as shown in block 915, the locating application 575 may be run from the mobile telecommunications network server 840, where the memory 845 of the mobile telecommunications network server operates as the memory 550 of the mobile communication device 500 and provides the functions of the application 575 over the mobile telecommunications network 810. As a further alternative, the mobile communication device 500 and the mobile telecommunications network server 840 may share portions of the locating application 575 where the mobile communication device 500 performs some operations and the mobile telecommunications network 810 performs other operations as appropriate given different operating conditions, for example, network traffic and computing power available at the communication device 500 and at the mobile telecommunications network server 840. There may be a charge or fee for providing the application in whole or in part over the mobile telecommunications network 810.

The four embodiments disclosed herein provide for locating information in the local environment in an expeditious manner, for example, especially when confronted with an overwhelming amount of information, information in another language, or when there is a need to locate information quickly.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory (ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device."

It should be understood that the foregoing description is only illustrative of the present embodiments. Various alternatives and modifications can be devised by those skilled in the art without departing from the embodiments disclosed herein. Accordingly, the embodiments are intended to embrace all such alternatives, modifications and variances which fall within the scope of the appended claims.

The invention claimed is:

1. A method comprising:
receiving a user input at a device including at least one identifying feature of an object whose location is sought in a physical environment surrounding the user, the user input being a depiction of at least a portion of the object drawn by the user, an image of at least a portion of the object, a text string, or a logo;
capturing an image of the physical environment;
analyzing, with a processor, the image for patterns that at least partially match the user input to determine if the object is present within the physical environment based on the user input received; and
determining that the object is present within the physical environment in an instance in which an object within the captured image at least partially matches the user input
causing the object within the image to be highlighted in response to the object being determined to be present within the image.

2. A non-transitory computer program product comprising at least one non-transitory computer-readable storage medium having computer-executable program code instructions stored therein, the computer-executable program code instructions comprising:
program code instructions for receiving a user input including at least one identifying feature of an object whose location is sought in a physical environment surrounding the user, the user input being a depiction of at least a portion of the object drawn by the user, an image of at least a portion of the object, a text string, or a logo;
program code instructions for capturing an image of the physical environment;
program code instructions for analyzing the image for patterns that at least partially match the user input to determine if the object is present within the physical environment based on the user input; and
program code instructions for, in an instance in which an object within the captured image at least partially matches the user input, determining that the object is present within the physical environment, and causing the object within the image to be highlighted in response to the object being determined to be present within the image.

3. The computer program product of claim 2, wherein the program code instructions for analyzing the image for patterns that at least partially match the user input received comprises comparing the captured image to a database of models.

4. The computer program product of claim 3, wherein the user input received is a drawn depiction or image of at least a portion of the object, the computer program product further comprising program code instructions for generating a model from the drawn depiction or the image of at least a portion of the object.

5. The computer program product of claim 2, wherein the program code instructions for highlighting the object comprises displaying the image received and highlighting portions of the image received that at least partially match the user input.

6. The computer program product of claim 2, wherein the program code instructions for receiving an image of a physical environment comprises program code instructions for providing interactive directions for capturing the image from the environment.

7. An apparatus comprising: at least one a processor; and at least one memory including computer program code, the at least one memory and the computer program code configured to, with the at least one processor, cause the apparatus at least to:
receive a user input including at least one identifying feature of an object whose location is sought in a physical environment surrounding the user, the user input being a depiction of at least a portion of the object drawn by the user, an image of at least a portion of the object, a text string, or a logo;
capture an image of the physical environment;
analyze the image for patterns that at least partially match the user input to determine if the object is present within the physical environment based on the user input received; and
determine that the object is present within the physical environment in an instance in which an object within the captured image at least partially matches the user input;
cause the object within the image to be highlighted in response to the object being determined to be present within the image.

8. The apparatus of claim 7, wherein causing the apparatus to analyze the image for patterns that at least partially match the user input received comprises causing the apparatus to compare the captured image to a database of models.

9. The apparatus of claim 8, wherein the user input received comprises a drawn depiction or image of at least a portion of the object, wherein the at least one memory and the computer program code are further configured to, with the at least one processor, cause the apparatus at least to generate additional models from the drawn depiction or the image of at least a portion of the object.

10. The apparatus of claim 7, wherein causing the apparatus to highlight the object comprises causing the apparatus to display the image received and highlight portions of the image received that at least partially match the user input.

11. The apparatus of claim 7, wherein causing the apparatus to receive an image of a physical environment comprises causing the apparatus to provide interactive directions for capturing the image from the environment.

12. The method of claim 1, wherein receiving user input including at least one identifying feature of an object comprises determining that the information is in the form of text or graphics.

13. The method of claim 1, wherein analyzing the image for patterns that at least partially match the user input received comprises comparing the captured image to a database of models.

14. The method of claim 13, wherein the user input comprises a drawn depiction or an image of at least a portion of the object, the method further comprising generating additional models from the drawn depiction or the image of at least a portion of the object.

15. The method of claim 1, wherein highlighting the object comprises: displaying the image received; and highlighting the portions of the image received that at least partially match the user input.

16. The method of claim 1, wherein receiving an image of a physical environment comprises providing interactive directions for capturing the image from the environment.

17. The apparatus of claim 7, wherein the at least one memory and the computer program code are further configured to, with the at least one processor, cause the apparatus at least to determine that the user input has been received in the form of text or graphics.

18. The apparatus of claim 7, wherein the at least one memory and the computer program code are further configured to, with the at least one processor, cause the apparatus at least to: analyze the image for patterns that at least partially match the user input received.

19. The apparatus of claim 7, wherein the at least one memory and the computer program code are further configured to, with the at least one processor, cause the apparatus at least to generate additional models from a picture or drawn depiction received as the user input.

* * * * *

UNITED STATES PATENT AND TRADEMARK OFFICE
CERTIFICATE OF CORRECTION

| | | |
|---|---|---|
| PATENT NO. | : 8,897,816 B2 | Page 1 of 1 |
| APPLICATION NO. | : 12/817748 | |
| DATED | : November 25, 2014 | |
| INVENTOR(S) | : Makkonen | |

It is certified that error appears in the above-identified patent and that said Letters Patent is hereby corrected as shown below:

In the claims:

Column 6,
Line 63, "user input" should read --user input received--.

Signed and Sealed this
First Day of September, 2015

Michelle K. Lee
*Director of the United States Patent and Trademark Office*